US010433530B2

(12) United States Patent
Klein

(10) Patent No.: US 10,433,530 B2
(45) Date of Patent: Oct. 8, 2019

(54) WEIGHTED HOLOGRAPHIC PLASTIC SPINNER BLADE AND METHOD OF MANUFACTURE

(71) Applicant: James Klein, Varysburg, NY (US)

(72) Inventor: James Klein, Varysburg, NY (US)

(*) Notice: Subject to any disclaimer, the term of this patent is extended or adjusted under 35 U.S.C. 154(b) by 204 days.

(21) Appl. No.: 15/799,095

(22) Filed: Oct. 31, 2017

(65) Prior Publication Data
US 2019/0124899 A1 May 2, 2019

(51) Int. Cl.
*A01K 85/10* (2006.01)
*A01K 95/00* (2006.01)
*B29C 45/16* (2006.01)
*B29L 31/52* (2006.01)
*B29K 705/12* (2006.01)

(52) U.S. Cl.
CPC ............ *A01K 85/10* (2013.01); *A01K 95/005* (2013.01); *B29C 45/1671* (2013.01); *B29C 45/1679* (2013.01); *B29K 2705/12* (2013.01); *B29L 2031/52* (2013.01)

(58) Field of Classification Search
CPC ......... A01K 85/10; A01K 85/12; A01K 85/14
See application file for complete search history.

(56) References Cited

U.S. PATENT DOCUMENTS

| 4,617,753 A | 10/1986 | Pauley | |
| 4,854,071 A * | 8/1989 | Kendall | A01K 85/14 43/42.33 |
| 5,084,996 A | 2/1992 | Woodruff | |
| 5,858,494 A | 1/1999 | Cherkas | |
| 6,272,787 B1 | 8/2001 | Link | |
| 6,301,823 B1 * | 10/2001 | Monticello | A01K 85/14 43/42.09 |
| 6,544,372 B2 | 4/2003 | Link | |
| 6,675,524 B2 | 1/2004 | McNally | |
| 7,121,039 B2 | 10/2006 | Fasnacht | |
| 9,049,852 B1 * | 6/2015 | Moran, Jr. | A01K 85/14 |
| 9,504,237 B2 * | 11/2016 | Culver | A01K 85/00 |
| 2012/0304523 A1 * | 12/2012 | Haldin | A01K 85/00 43/42 |
| 2014/0033601 A1 * | 2/2014 | Moran, Jr. | A01K 85/14 43/42.39 |
| 2018/0007876 A1 * | 1/2018 | Senter | A01K 85/10 |

* cited by examiner

*Primary Examiner* — Richard G Davis
(74) *Attorney, Agent, or Firm* — Vincent G. LoTempio; Kloss, Stenger & LoTempio; David T. Stephenson

(57) ABSTRACT

A weighted and holographic plastic spinner blade comprises a plastic elliptical-shaped spinner blade having a body formed in plastic injection molding and, integral to the body, a printed label on a first side of body and a weight at an aft end of body. An ink or foil is hot stamped at a second side of the body to create a holographic image that is visible through the body and printed label, forming visual fish attractant properties. Method of manufacture includes: providing an elliptical-shaped mold; positioning a partially transparent printed label on a first side of mold; positioning a weight member in an aft end of the mold; injecting a polymer composition into the mold to form body; hot stamping foil on second side of the body, the ink or foil forming a holographic image; the holographic image visible through the at least partially transparent printed label and body.

20 Claims, 9 Drawing Sheets

FIG. 1

WEIGHTED HOLOGRAPHIC PLASTIC SPINNER BLADE AND METHOD OF MANUFACTURE

FIELD OF THE INVENTION

The present invention relates generally to a weighted holographic plastic spinner blade and method of manufacture. More so, the present invention relates to a weighted spinner blade and method for manufacturing the blade that is used as a lure for catching fish; whereby the plastic spinner blade comprises a plastic elliptical-shaped spinner blade having a body formed in plastic injection molding and, integrated into the body during the plastic injection molding process, a printed label on a first side of body and a weight at an aft end of body; whereby an ink or foil is hot stamped at a second side of the body to create a holographic image that is visible through the body and printed label, forming visual fish attractant properties.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, spinner baits for years have been one of the most reliable lures of the trout fishermen, not to mention their use for all other species of fish and types of fishing from the lakes to the streams. Such lures are typically constructed from a number of piece-part components which, depending upon the overall lure design, can be altered either as to size, shape, color or placement relative to each other. Typically, however, the components include a line-attaching swivel, a stamped metal spinner blade, a colored attractant portion, such as one or more beads, the hook and means for attaching the hook to a wire carrier. Depending upon the type of fishing, such lures may also include live bait holders, such as used in trolling, or can be constructed for use independent of live bait.

Injection molding is a common manufacturing process for producing plastic parts. Typically, material is fed into a heated barrel, mixed, and forced into a mold cavity where it cools and hardens to the configuration of the cavity. The molds are usually made of metal and precision-machined to form the features of the desired part. Injection molding is widely used for manufacturing a variety of parts, from the smallest component to entire body panels of cars.

Conventional hot stamping methods encompass stamping a substrate with the hot stamp material, such that the pre-dried ink or gold or silver film is generally released from the base film. The release of the pre-dried ink, or gold or silver film, in turn, causes the adhesive layer, which is generally coated on the pre-dried ink, or gold or silver film, to undergo a conformational change. The resulting conformational change, in turn, enables the adhesive layer to effectively attach the pre-dried ink, or gold or silver film to the underlying substrate. The pre-dried ink, or gold or silver film is thus hot-stamped.

Other proposals have involved fabricating spinner baits for fishing. The problem with these fishing baits is that they are fabricated from metal and painted and use adhesive labels to enhance the appearance. This paint chips and the labels peel off and they rust.

They do not spin in an attractive way when used across a wide speed range, each stamped shape is Specific to a speed range so as to attract fish. They also do not provide a printed label with a holographic image integrated therein to further enhance color attractive properties of the bait. Even though the above cited fishing baits meets some of the needs of the market, a method for manufacturing a weighted holographic plastic spinner blade for catching fish; whereby the plastic spinner blade comprises a body that is defined by an elliptical shape, forms a slight arc, and has a weighted aft end that causes the spinner blade to spin like a propeller when in motion; and further the body comprises an integrated printed label and hot stamped holographic image visible through the printed label, so as to create varying degrees of flash and vibration replicating the color and movement of a small fish or other aquatic bait, is still desired.

SUMMARY

Illustrative embodiments of the disclosure are generally directed to a weighted holographic plastic spinner blade and method of manufacture. The weighted holographic plastic spinner blade comprises a plastic elliptical-shaped spinner blade having a body formed in plastic injection molding and, integral to the body, a printed label on a first side of the body and a weight member at an aft end of the body. An ink or foil is hot stamped at a second side of the body to create a holographic image that is visible through the body and printed label to provide advantageous lure action and visual fish attractant properties.

The plastic spinner blade comprises a body that is defined by an elliptical shape, forms a slight arc, and has a weighted aft end that causes the spinner blade to spin like a propeller when in motion. The body comprises an integrated printed label on a first side and a weight member at an aft end, with a holographic image hot stamped into the second side of the body, so that the printed label and holographic image are simultaneously visible to create varying degrees of flash and vibration replicating the color and movement of a small fish or other aquatic bait.

The weighted spinner blade is manufactured through a process involving the plastic injected molding of the body and the integration of a die cut label and a weight member into the molded body. The method includes the steps of: providing an elliptical-shaped mold, positioning a printed label to a first side of the mold and a weight member into an aft end of the mold; injecting a polymer composition into the mold; cooling the mold to form an elliptical-shaped body from the injected polymer composition, whereby the printed label integrates into a first side of the formed polymer body and the weight member integrates into the aft end of the formed polymer body.

The method further comprises hot stamping a pre-dried ink or a foil to a second side of the body, whereby the pre-dried ink or foil forms a holographic image, and whereby the holographic image is partially visible through the body and the printed label, and whereby the printed label and the holographic image form a fish attracting image on the body.

One objective of the present invention is to provide a spinner blade with enhanced lure action and visual fish attractant properties.

Another objective is to provide a plastic spinner blade having an elliptical shape, a slight arc, and a weighted aft end that causes the spinner blade to spin like a propeller when in motion.

Another objective is create a spinner blade that spins with lower rpm's so it can be used across a wide speed range. Starting to spin at a slower speed and continuing to spin with an attracting spin at higher speeds.

Yet another objective is to integrate the printed label and weight with the plastic injected body during the plastic injection mold process.

Yet another objective is to hot stamp a holographic image on the reverse side of the body while still allowing for visibility through the printed label.

Yet another objective is to create a visual effect that highlights the printed label and the holographic image simultaneously, and creates varying degrees of flash and vibration replicating the color and movement of a small fish or other aquatic bait.

Yet another objective is to provide an inexpensive method to manufacture weighted holographical designed plastic spinner blade thus avoiding the problems of paint and labels coming off and corrosion of metal.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
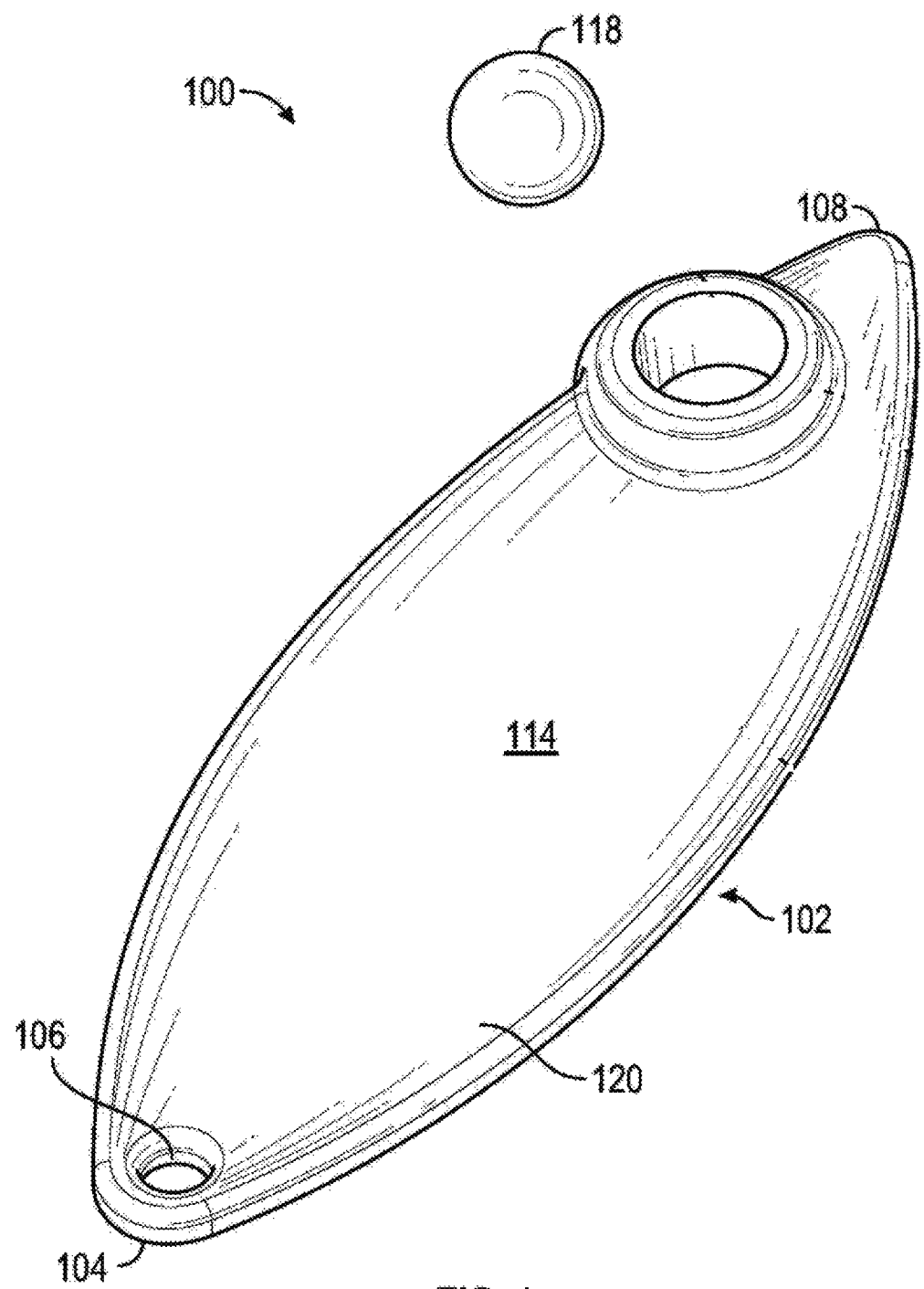
FIG. 1 illustrates a perspective view of an exemplary weighted holographic plastic spinner blade, showing a first side, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "aft," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A weighted holographic plastic spinner blade 100 and method 200 of manufacture is referenced in FIGS. 1-17. Weighted holographic plastic spinner blade 100, hereafter "blade 100", is an artificial lure that is often used for luring fish to a hook. Blade 100 comprises a body 102 that has a unique plastic composition that enhances the lure action, motion, and usability of blade 100 during fishing operations. In one non-limiting embodiment, body 102 forms a slight arc shape and has a weighted aft end 108 that further enhances lure action, creating a propeller-like spinning motion when body 102 is pulled through a fluid with a fishing line 128.

In addition to the structural characteristics, blade 100 also provides unique visual lure-enhancing properties. Blade 100 integrates, both a printed label and a holographic image 124 into opposite sides of the body 102. Printed label 120 is at least partially transparent, so that both printed label 120 and holographic image 124 are simultaneously visible through body 102, creating varying degrees of flash and vibration replicating the color and movement of a small fish or other aquatic bait that enhances game fish attractant properties.

Figure 2:
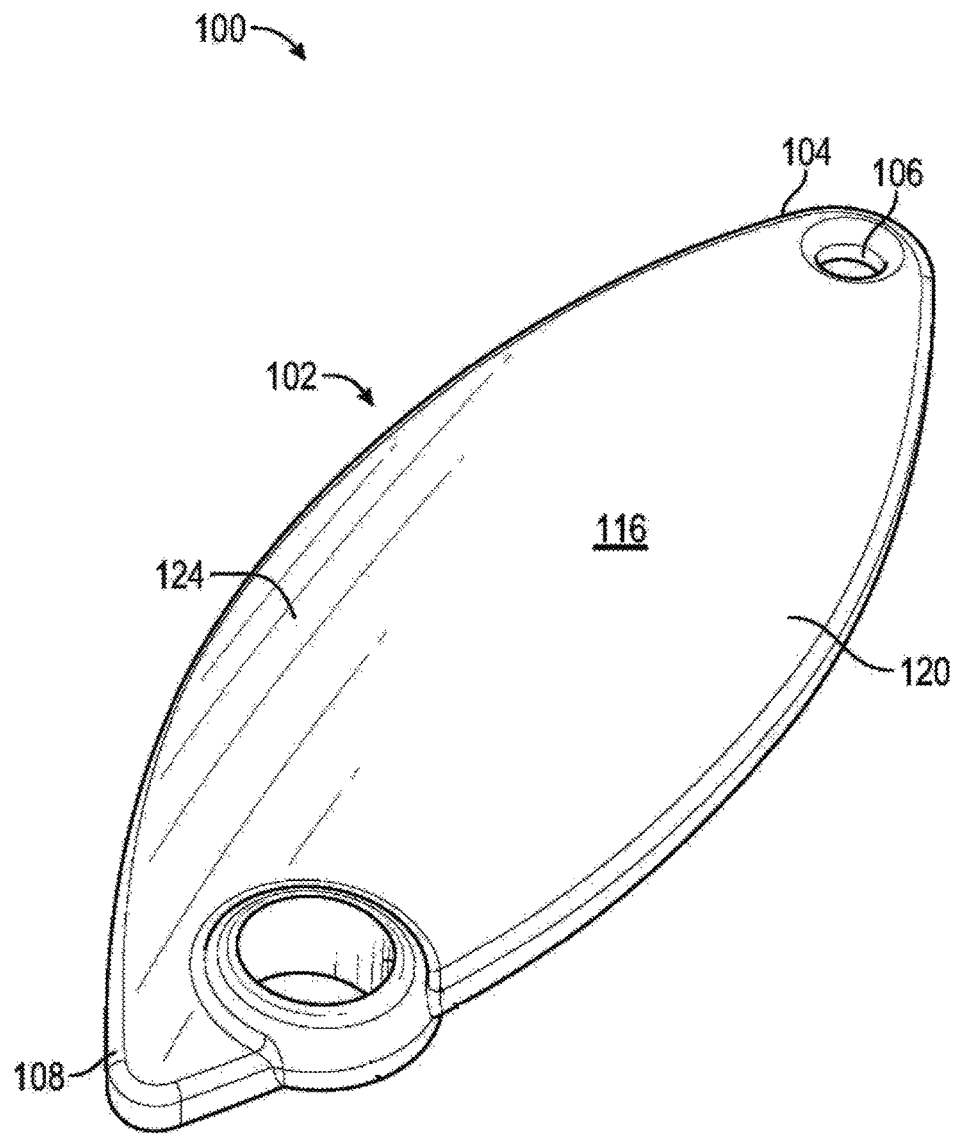
FIG. 2 illustrates a perspective view of the weighted holographic plastic spinner blade shown in FIG. 1, showing a second side, in accordance with an embodiment of the present invention.
Figure 3:
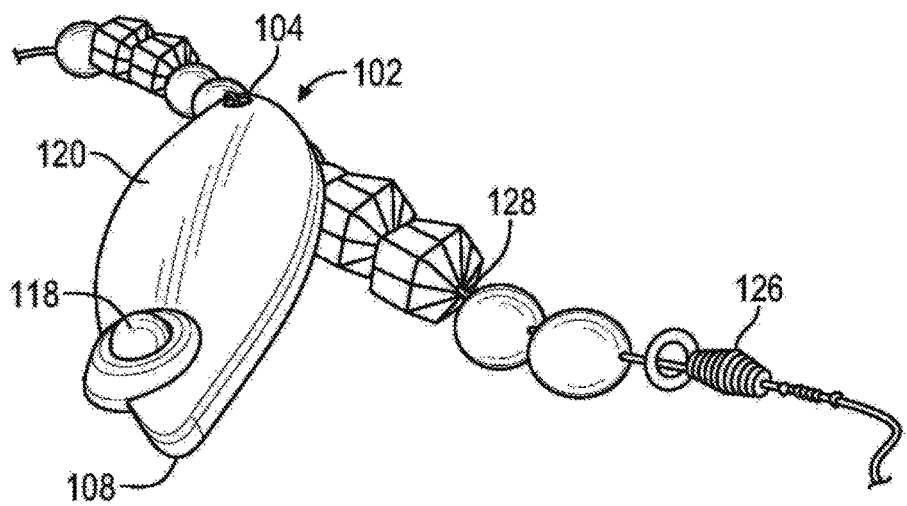
FIG. 3 illustrates a front perspective view of the weighted holographic plastic spinner blade shown in FIG. 1, with a fishing line and a line-attaching clevis attached to the front aperture to enable the body to swivel while being pulled through water, in accordance with an embodiment of the present invention.

As FIG. 1 references, body 102 is defined by an aft end 108, a front end 104, a first side 114, and a second side 116 that is similar to the first side 114. However, in one non-limiting embodiment, first side 114 may be convex, while second side 116 may be concave in configuration (FIG. 2). Body 102 is further unique in having a generally elliptical shape that forms a slight arc. In one non-limiting embodiment, body 102 is at least partially transparent. Body 102 may also have different colors and dimensions while still maintaining a substantially elliptical shape.

Body 102 is configured to resemble a small fish, and also to spin in a propeller-like motion when being pulled by a fishing line 128 from its aft end 108. The plastic composition of body 102 is different that the stamped metal spinner baits known in the art. The elliptical shape of body 102 is scalable in shape and dimensions to achieve different styles of fish or baiting different game.

In one non-limiting embodiment, length of body 102 is 1.96 inches and width 0.7 inches. Though other shapes and dimensions may be used. For example, a Colorado shaped spinner blade, an Indiana shaped spinner blade, a willow shape spinner blade, or a hatchet spinner blade known in the art are both operable in the disclosed structure and method of manufacture discussed here.

Figure 4:
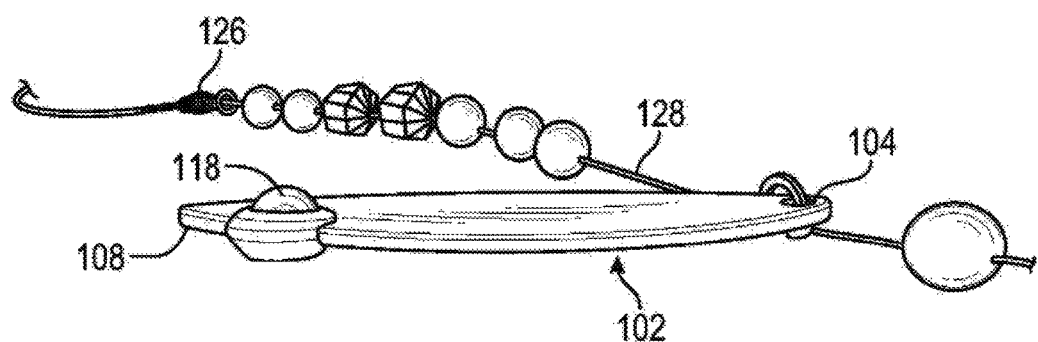
FIG. 4 illustrates a side perspective view of the weighted holographic plastic spinner blade shown in FIG. 1, with a fishing line and a line-attaching clevis attached to the front aperture to enable the body to swivel while being pulled through water, in accordance with an embodiment of the present invention.

In addition to body 102, the blade 100 may also include other components known in the art of fish lures, including: a line-attaching swivel 126 (FIG. 3), a colored attractant portion, such as one or more beads, and a hook and means for attaching the hook to a wire carrier. As FIG. 4 shows, line-attaching swivel 126 allows body 102 to swivel 360° while being pulled through fluid; thereby enhancing the color, glitter, and motion of blade 100. Depending upon the type of fishing and game being sought, the blade 100 may also attach to live bait, such as used in trolling, artificial bait, or be used as is, independent of other baits.

Figure 5:
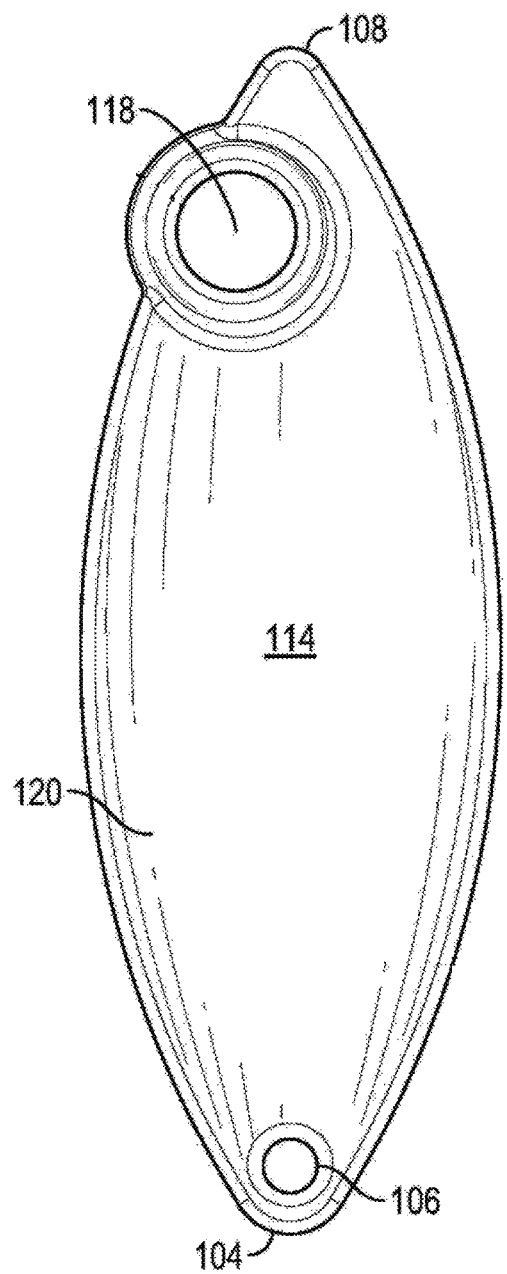
FIG. 5 illustrates a top view of the weighted holographic plastic spinner blade shown in FIG. 1, showing the first side, in accordance with an embodiment of the present invention.
Figure 6:
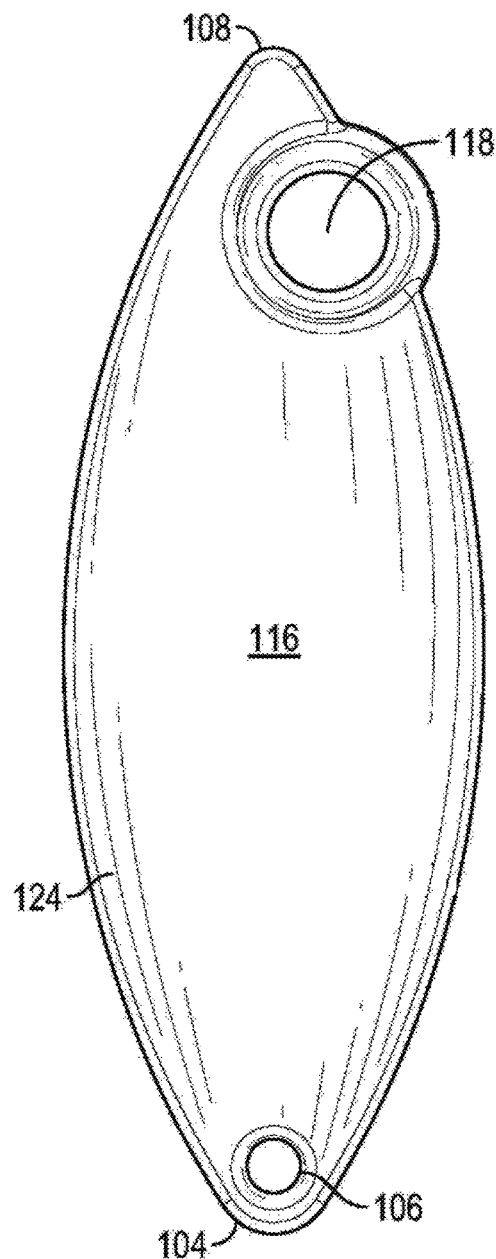
FIG. 6 illustrates a top view of the weighted holographic plastic spinner blade shown in FIG. 1, showing the second side, in accordance with an embodiment of the present invention.
Figure 7:
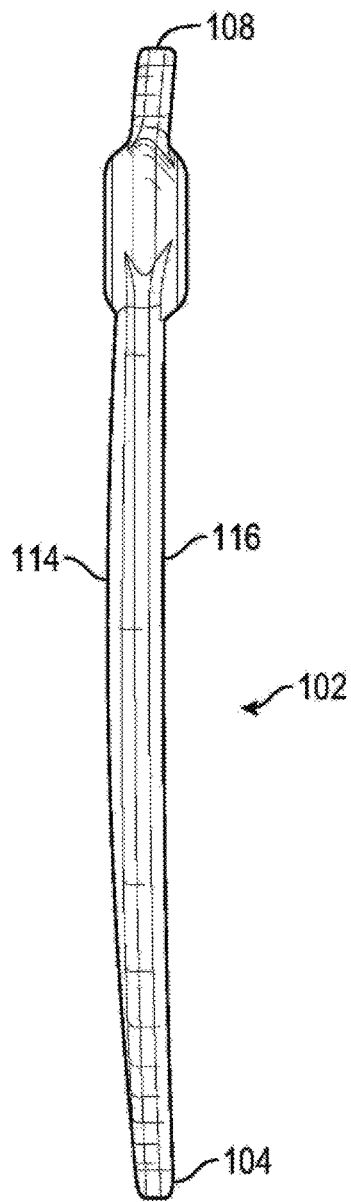
FIG. 7 illustrates an elevated side view of the weighted holographic plastic spinner blade shown in FIG. 1, showing the left side, in accordance with an embodiment of the present invention.
Figure 8:
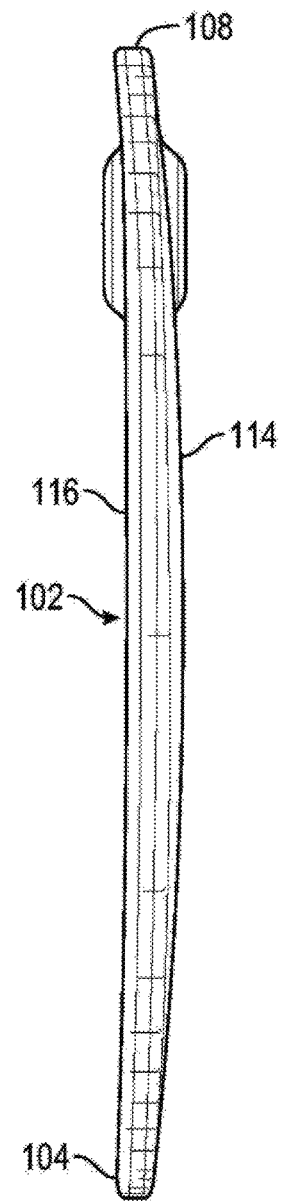
FIG. 8 illustrates an elevated side view of the weighted holographic plastic spinner blade shown in FIG. 1, showing the right side, in accordance with an embodiment of the present invention.

In one non-limiting embodiment, shown in FIGS. 5 and 6, a weight member 118 is integrated into aft end 108 of a mold 110 during formation of body 102 through plastic injection molding. Specifically, weight member 118 is positioned into aft end of the mold 110 prior to injecting a plastic composition into the mold. After the injection molding is complete, an elliptical-shaped body 102 having the integrated weight member 118 in the aft end 108 of the body 102 forms.

Weight member 118, thus forms a snug fit into aft end 108 of body 102, or may even form a friction-fit relationship thereto. However, any fastening means known in the art may also be used to integrate weight member 118 into aft end 108 of body 102.

Weight member 118 works to add weight to the aft end 108 of body; and thereby affect the motion of body 102 as it is being pulled through a fluid—adding weight to the arc-shaped, plastic configuration of body 102. Thus, as body 102 is pulled through the water by a fishing line 128, the weight member 118 creates centrifugal forces that create a spinning motion of the body 102. The slower spin (rpm) of the blade 100 allows body 102 to initially start spinning at a slower speed, and also allows blade 100 to be used at faster spinning rates, such as when being pulled by a motor boat.

Weight member 118 allows the spinner blade 100 to spin like a propeller, in a similar spinning motion to a metal spinner blade 100 known in the art, but at a greater rotational velocity. Thus, the combination of the plastic composition of the body, the slight arc shape, the plastic composition, and the weighted aft end 108 causes the body 102 to spin like a propeller when being pulled by a fishing line 128. In one non-limiting embodiment referenced in FIGS. 7 and 8, weight member 118 includes a stainless steel ball bearing. In another non-limiting embodiment, weight member 118 has a weight of 0.8 grams and a diameter of 0.218 inches.

Figure 9:
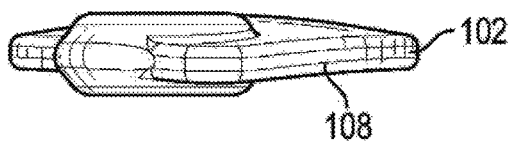
FIG. 9 illustrates a frontal view of the weighted holographic plastic spinner blade shown in FIG. 1, in accordance with an embodiment of the present invention.

Turning now to FIG. 9, the front end 104 of body 102 has formed therein a front aperture 106 that may be used to attach a line-attaching swivel 126, a fishing line 128, a live bait holder, or other fishing lure accessory known in the art. Front aperture 106 may have a generally circular shape. Though in other embodiments, various other shapes are possible. Thus, as fishing line 128 attaches to front aperture 106, front end 104 of body 102 leads as the spinning body 102 is pulled through the fluid.

It is significant to note that the variable spinning speed of blade 100 is a result of both the plastic configuration of body 102 and the weight member 118. This spinning functionality provides a great advantage for attracting fish to the blade 100. Those skilled in the art recognize that to accomplish such variable spinning rates with the current metal spinner blades it is necessary to use different styles of blades for each desired spin rate. For example, a Colorado type spinner blade at slow speeds, and a willow style at higher speeds. Thus, the present disclosure allows the blade 100 to be used at all speed ranges known in the art.

Figure 10:
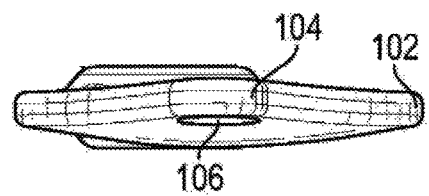
FIG. 10 illustrates a rear view of the weighted holographic plastic spinner blade shown in FIG. 1, in accordance with an embodiment of the present invention.
Figure 11:
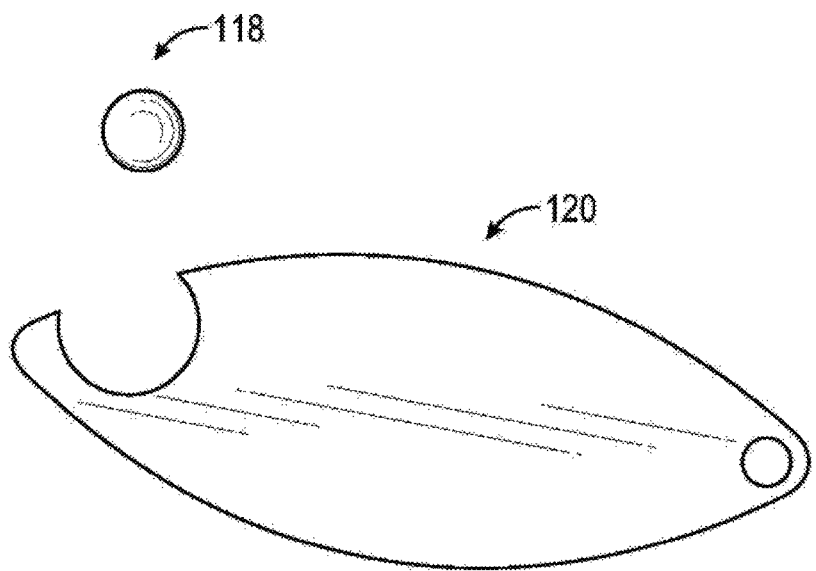
FIG. 11 illustrates a top view of a printed label and weight member used for application to a body of a plastic spinner blade, in accordance with an embodiment of the present invention.

As FIG. 10 illustrates, blade 100 may further include various unique visual components that are integrated into the body 102. Body 102 has integrated therein a printed label 120, which may include a printed label die. Printed label 120 is configured to integrate eclectic colors, patterns, and dimensions in the body of blade 100. As FIG. 11 illustrates, printed label 120 may be cut to the exact shape of body 102 to overlay the first side of the mold 110 during the plastic injection molding to fabricate body 102.

Figure 12:
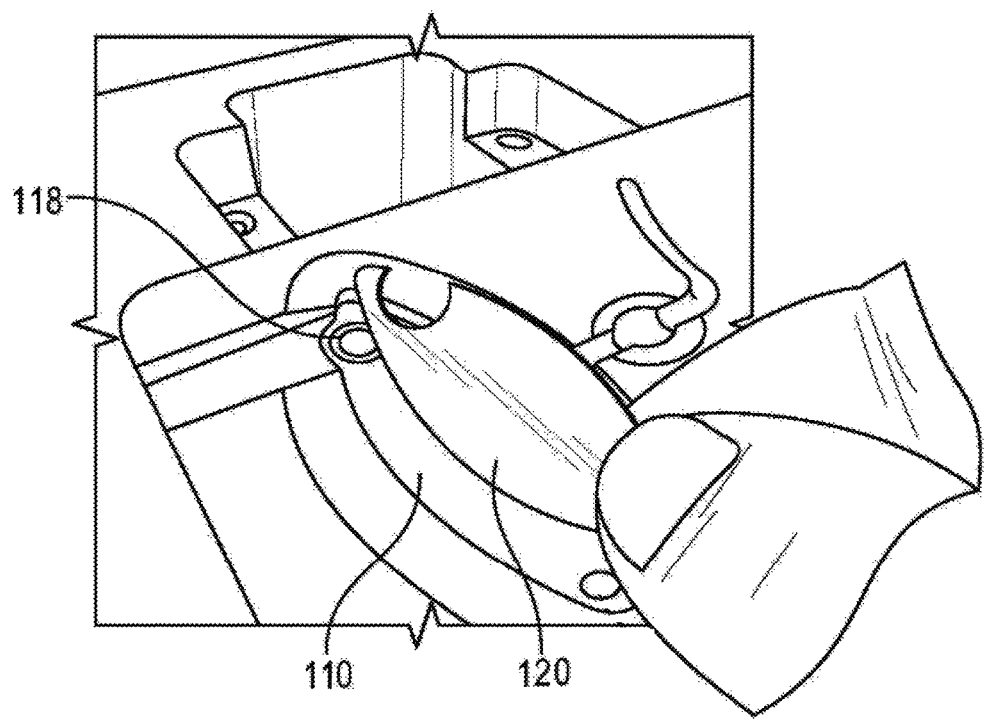
FIG. 12 illustrates a perspective view of the body formed by plastic injection molding and the printed label being inserted into the injection mold preparing it for integration into the first side of the body, in accordance with an embodiment of the present invention.

As FIG. 12 illustrates, printed label 120 is then inserted into the plastic injection mold to be integrated into body 102 through means known in the art. Printed label 120 is integrated into the body 102 during the plastic injection molding process, simultaneous with the weight member 118 integration therein. After the plastic injection molding, the weight member 118 and printed label 120 are integrated into aft end and first side of body 102, respectively.

After body 102 is removed from mold 110, a holographic image 124 is hot stamped on second side 116 of body 102. The hot stamping process may involve hot stamping a pre-dried ink or foil 122, such as a gold foil, or a silver foil directly onto second side 116 of body 102, which does not have printed label 120 covering it. The hot stamp creates a holographic image 124 on second side 116 of body 102. Holographic image 124 is visible through the at least partially transparent printed label 120 and the body 102. Foil 122 applied in this manner may include a printed, partially transparent holographic panel from the hot stamp that creates a holographic image or illusion on the body 102, and that is visible from both the first and second sides 114, 116 thereof.

For example, a striped red printed label is visible under a silver-colored holographic image, creating a visual effect of red fish gills under silver-colored fins. This color scheme may be indicative of a particular type of fish. In another example, a yellow printed label is integrated into the first side of the body, while a green printed label is integrated into the second side of the body. A purple and white holographic image partially covers the green printed label on the second side of the body.

Such color and imaging combinations may be useful for fishing in muddy waters, where there is not much light. Thus, the combination of both a printed label 120 and a holographic image 124 that is at least partially visible through the printed label 120 creates varying degrees of flash and vibration that replicate the color and movement of a small fish or other aquatic bait. Further, any combination of colors, patterns; and textures may be used to enhance performance of blade 100.

Figure 13:
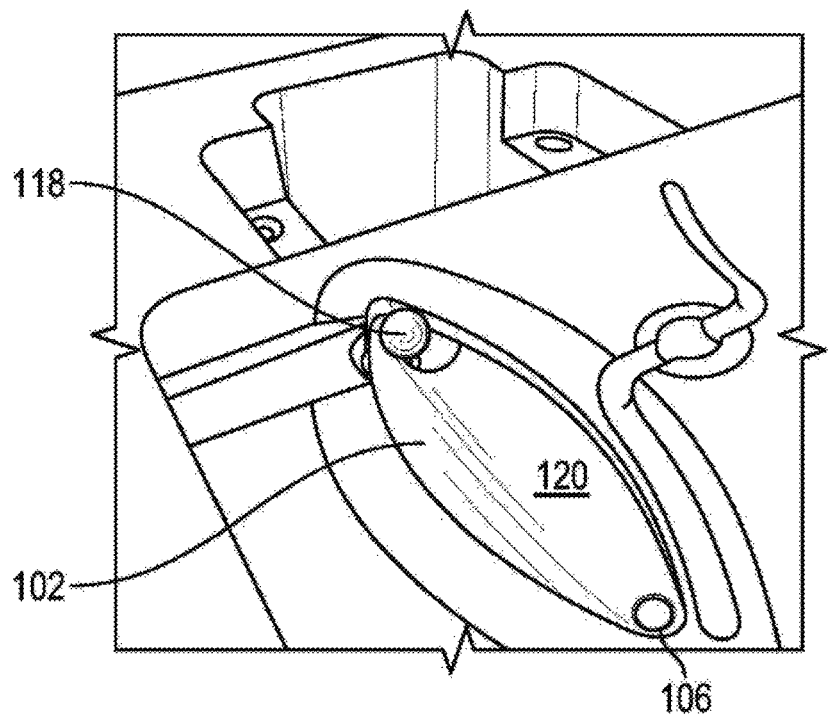
FIG. 13 illustrates perspective view of the injection mold with the printed label in place and the weight member being inserted into place for integration with the body.

FIG. 13 illustrates weight member 118 positioned into aft end of the mold. As described above, weight member 118 securely integrates into aft end 108 of body 102 during plastic injection molding process that forms the body. Weight member 118 works to affect the motion of body 102 as it is being pulled through water—adding weight to the arc-shaped, plastic configuration of body 102, and allowing body 102 to spin at different speeds.

Figure 14:
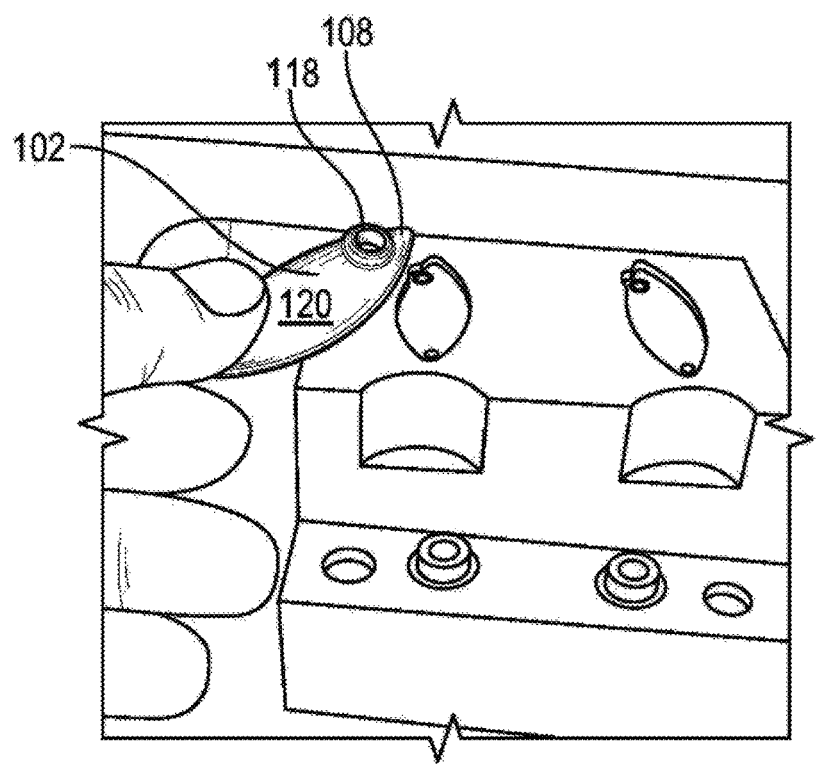
FIG. 14 illustrates a perspective view of the body being removed from the plastic injection molding with the label and weight member integrated therein, in accordance with an embodiment of the present invention.

Simultaneous with weight member 118, printed label 120 is integrated into the body 102 during the plastic injection molding process, simultaneous with the weight member 118 integration therein. FIG. 14 illustrates labeled and weighted body 102 being removed from mold in plastic injection molding mechanism.

Figure 15:
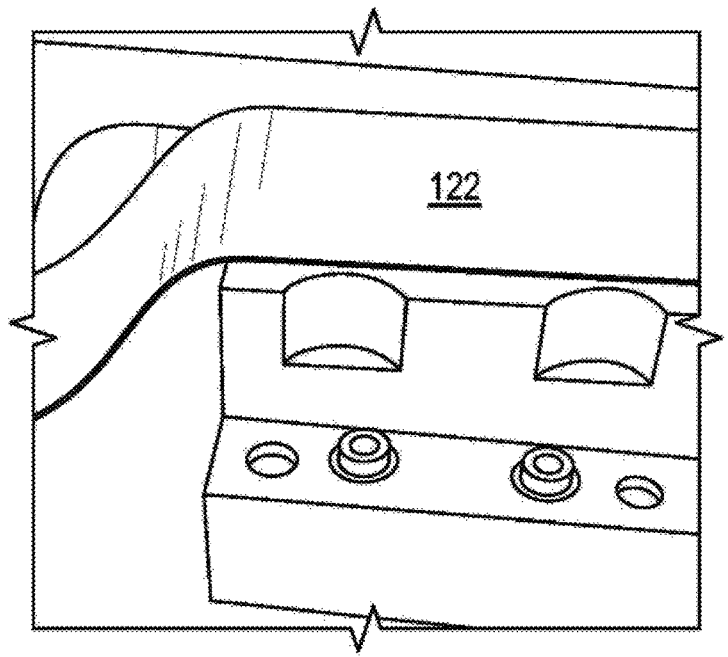
FIG. 15 illustrates a perspective view of a holographic foil to be applied to the body, in accordance with an embodiment of the present invention.
Figure 16:
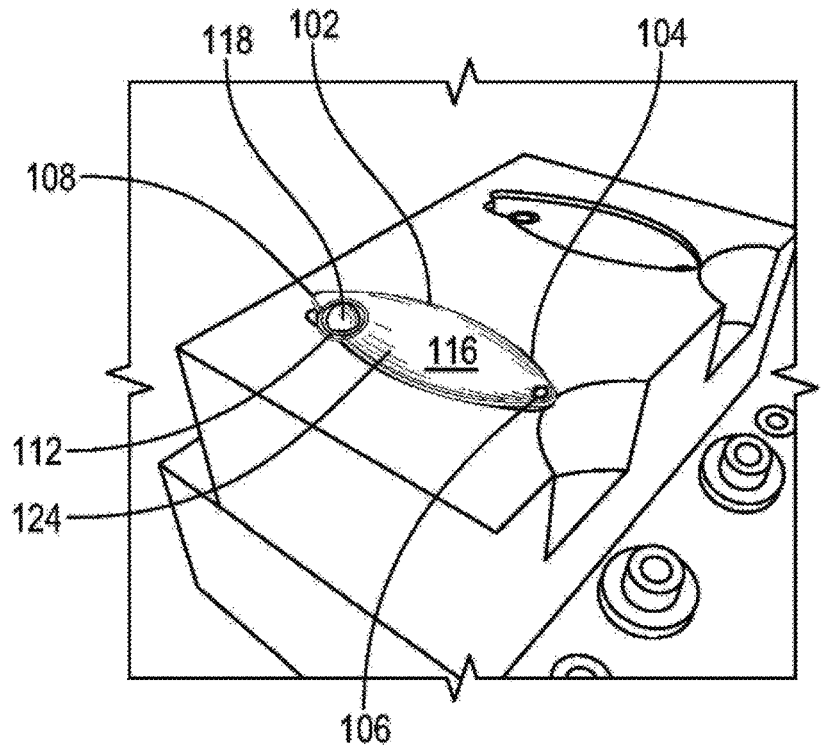
FIG. 16 illustrates a perspective view of the holographic foil applied to the opposite side of the body as the printed label to create a holographic image visible through the integrated printed label, in accordance with an embodiment of the present invention.

Looking now at FIG. 15, body 102 is next moved to hot stamping mechanism to integrate pre-dried ink or foil 122 directly on second side 116 of body 102. Foil 122 applied to second side 116 of body 102 in this manner may include a printed, partially transparent holographic panel from the hot stamp that creates a holographic image or illusion. As FIG. 16 shows, the hot stamp creates a holographic image 124 on second side 116 of the body 102 that is visible through the at least partially transparent printed label 120 and body 102.

Figure 17:
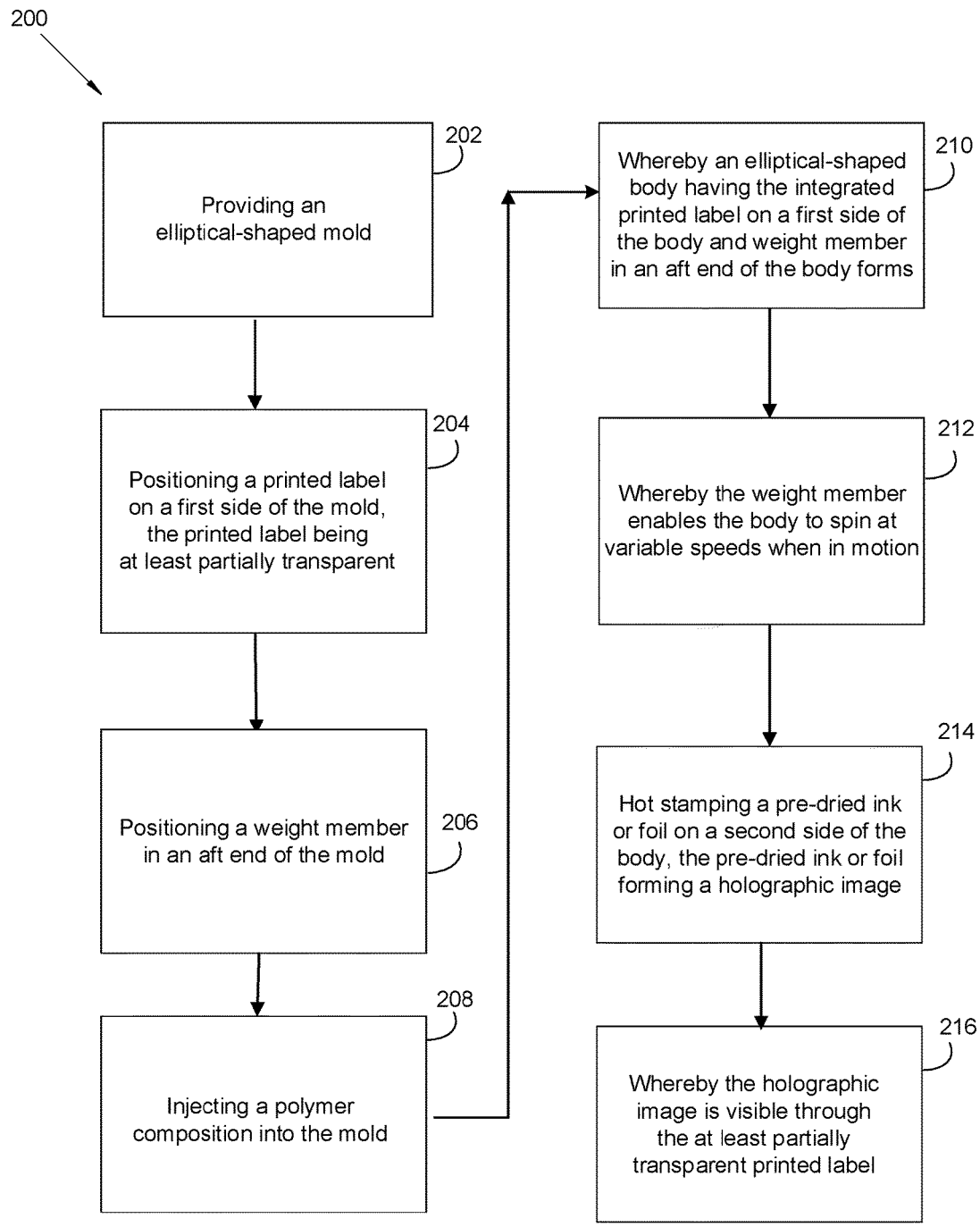
FIG. 17 illustrates a flowchart of an exemplary method for manufacturing a weighted holographic plastic spinner blade, in accordance with an embodiment of the present invention.

As referenced in the flowchart of FIG. 17, a method 200 of manufacturing plastic spinner blade 100 involves the plastic injected molding to form the body 102, during which a die cut printed label 120 and a weight member 118 are integrated into the first side 114 and aft end 108, respectively, of the plastic injection-formed body 102. Next, a holographic image 124 is hot stamped onto a second side 116 of the body 102. Holographic image 124 is visible through printed label 120 and body 102 to create a fish-attracting visual effect as blade 100 spins through fluid. The weight member 118 adds weight and in conjunction with plastic composition of body 102, allows blade 100 to spin at variable speeds.

Method 200 may include an initial Step 202 of providing an elliptical-shaped mold. Method 200 may further comprise a Step 204 of positioning a printed label on a first side of the mold, the printed label being at least partially transparent. A Step 206 includes positioning a weight member in an aft end of the mold. A Step 208 comprises injecting a polymer composition into the mold. This forms the elliptical-shaped body. Additional steps may include heating the mold prior to injection the plastic composition, and cooling the mold after the body is formed for removal thereof.

In one non-limiting embodiment, a Step 210 includes, whereby an elliptical-shaped body having the integrated printed label on a first side of the body and weight member in an aft end of the body forms. In some embodiments, a Step 212 may include, whereby the weight member enables the body to spin at variable speeds when in motion. A Step 214 may include hot stamping a pre-dried ink or foil on a second side of the body, the pre-dried ink or foil forming a holographic image. A final Step 216 comprises, whereby the holographic image is visible through the at least partially transparent printed label 120 and the body 102.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A weighted and holographic plastic spinner blade, the plastic spinner blade comprising:
    a plastic body defined by a front end, an aft end, a first side, and a second side similar to the first side, the body further being defined by a generally elliptical shape forming a slight arc, the front end forming a front aperture;
    a weight member integrated into the aft end of the body;
    a printed label integrated into the first side of the body, whereby the weight member and the printed label integrate into the body through plastic injection molding; and
    a pre-dried ink or a foil hot stamped on the second side of the body, the pre-dried ink or foil forming a holographic image,
    whereby the holographic image is the printed label are at least partially visible on the body.

2. The plastic spinner blade of claim 1, wherein the body has a generally arced shape.

3. The plastic spinner blade of claim 1, wherein the body is at least partially transparent.

4. The plastic spinner blade of claim 1, wherein the printed label is die cut.

5. The plastic spinner blade of claim 1, wherein the weight member is a stainless steel ball.

6. The plastic spinner blade of claim 1, wherein the front aperture is defined by a generally circular shape.

7. The plastic spinner blade of claim 1, wherein the front aperture receives a line-attaching swivel.

8. The plastic spinner blade of claim 7, wherein the line-attaching swivel attaches to a fishing line.

9. A method of manufacturing a weighted and holographic plastic spinner blade, the method comprising:
providing an elliptical-shaped mold;
positioning a printed label on a first side of the mold, the printed label being at least partially transparent;
positioning a weight member in an aft end of the mold;
injecting a polymer composition into the mold;
whereby an elliptical-shaped body having the integrated printed label on a first side of the body and weight member in an aft end of the body forms;
whereby the weight member enables the body to spin at variable speeds when in motion;
hot stamping a pre-dried ink or foil on a second side of the body, the pre-dried ink or foil forming a holographic image; and
whereby the holographic image is visible through the at least partially transparent printed label.

10. The method of claim 9, wherein the body is at least partially transparent.

11. The method of claim 10, whereby the holographic image is visible through the body and the at least partially transparent printed label.

12. The method of claim 9, wherein the step of injecting a polymer composition into the mold, further comprises heating the mold.

13. The method of claim 9, wherein the step of injecting a polymer composition into the mold, further comprises cooling the mold to form an elliptical-shaped body from the injected polymer composition.

14. The method of claim 9, further comprising a step of tying a line-attaching swivel and a fishing line around the front aperture.

15. The method of claim 14, further comprising a step of pulling the body through water with the fishing line to create a spinning motion.

16. The method of claim 9, wherein the body has a generally arced shape.

17. The method of claim 9, wherein the printed label is die cut.

18. The method of claim 9, wherein the weight member is a stainless steel ball.

19. The method of claim 9, wherein the front aperture has a circular shape.

20. A method of manufacturing a weighted and holographic plastic spinner blade, the method consisting of:
providing an elliptical-shaped mold;
heating the mold;
positioning a printed label on a first side of the mold, the printed label being at least partially transparent;
positioning a weight member in an aft end of the mold;
injecting a polymer composition into the mold;
cooling the mold;
whereby an elliptical-shaped body having the integrated printed label on a first side of the body and weight member in an aft end of the body forms, the body being at least partially transparent;
whereby the weight member enables the body to spin at variable speeds when in motion;
hot stamping a pre-dried ink or foil on a second side of the body, the pre-dried ink or foil forming a holographic image;
whereby the holographic image is visible through the at least partially transparent printed label and the body;
tying a line-attaching swivel and a fishing line around the front aperture; and
pulling the body through a fluid with the fishing line to create a spinning motion.

* * * * *